US008542750B2

(12) United States Patent
Cha et al.

(10) Patent No.: US 8,542,750 B2
(45) Date of Patent: Sep. 24, 2013

(54) DEBLOCKING CONTROL METHOD CONSIDERING INTRA BL MODE AND MULTILAYER VIDEO ENCODER/DECODER USING THE SAME

(75) Inventors: Sang-chang Cha, Hwaseong-si (KR); Ho-jin Ha, Seoul (KR); Kyo-hyuk Lee, Seoul (KR); Bae-keun Lee, Bucheon-si (KR); Jae-young Lee, Suwon-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1769 days.

(21) Appl. No.: 11/322,392

(22) Filed: Jan. 3, 2006

(65) Prior Publication Data

US 2006/0146941 A1    Jul. 6, 2006

Related U.S. Application Data

(60) Provisional application No. 60/641,004, filed on Jan. 4, 2005.

(30) Foreign Application Priority Data

Jan. 28, 2005    (KR) .......................... 10-2005-008136

(51) Int. Cl.
H04B 1/66    (2006.01)
H04N 7/12    (2006.01)
H04N 11/04   (2006.01)
H04N 11/02   (2006.01)

(52) U.S. Cl.
USPC ............. 375/240.29; 375/240.24; 375/240.12

(58) Field of Classification Search
USPC ............... 375/240, 240.01–240.29; 382/260, 382/233, 235, 238
See application file for complete search history.

(56) References Cited

U.S. PATENT DOCUMENTS 6,160,503 A    12/2000    Andrews et al.
6,292,512 B1    9/2001    Radha et al.
(Continued)

FOREIGN PATENT DOCUMENTS

EP    0808068 B1    8/2004
KR    10-2003-0065277 A    8/2003
(Continued)

OTHER PUBLICATIONS

Joint Video Team (OME) of ISO/IEC MPEG & ITU-T VCEG, Draft ITU-T Recommendation and Final Draft International Standard of Joint Video Specification (ITU-T Rec. H.264 {cube root} ISO/IEC 14496-10 AVC), JVT-G050, 7th Meeting: Pattaya, Thailand, Mar. 7-14, 2003, pp. 138-147.

(Continued)

Primary Examiner — Thomas D Lee
(74) Attorney, Agent, or Firm — Sughrue Mion, PLLC

(57) ABSTRACT

A deblocking filter used in a video encoder/decoder based on a multilayer is disclosed. The deblocking filtering method includes choosing a present block and its neighboring block on which a deblocking filtering will be performed, judging whether the present block and the neighboring block have been coded by the intra BL mode, choosing a deblocking filter strength according to the result of the judgment, and performing the deblocking filtering with respect to a boundary between the present block and the neighboring block and according to the deblocking filter strength.

29 Claims, 13 Drawing Sheets

(56) References Cited

U.S. PATENT DOCUMENTS

| | | |
|---|---|---|
| 7,372,905 B2 | 5/2008 | Foo et al. |
| 2001/0019634 A1 | 9/2001 | Lainema et al. |
| 2003/0085888 A1 | 5/2003 | Lafruit |
| 2003/0235250 A1 | 12/2003 | Varma et al. |
| 2004/0017852 A1 | 1/2004 | Garrido et al. |
| 2004/0032908 A1 | 2/2004 | Hagai et al. |
| 2004/0101059 A1 | 5/2004 | Joch et al. |
| 2004/0179620 A1 | 9/2004 | Foo et al. |
| 2006/0104357 A1* | 5/2006 | Burazerovic et al. .... 375/240.15 |
| 2006/0126962 A1* | 6/2006 | Sun .............................. 382/268 |
| 2006/0209959 A1* | 9/2006 | Sun .......................... 375/240.16 |

FOREIGN PATENT DOCUMENTS

| | | |
|---|---|---|
| RU | 2093968 C1 | 10/1997 |
| RU | 2154917 C2 | 8/2000 |
| WO | 2004/008773 A1 | 1/2004 |
| WO | WO 2004/064396 A1 | 7/2004 |
| WO | 2006/073241 A1 | 7/2006 |

OTHER PUBLICATIONS

Bahadir K. Gunturk et al., "Multiframe Blocking-Artifact Reduction for Transform-Coded Video", IEEE Transactions on Circuits and Systems for Video Technology, vol. 12, No. 4, Apr. 2002, pp. 276-282.

Peter List, et al., "Adaptive Deblocking Filter" IEEE Transactions on Circuits and Systems for Video Technology, vol. 13, No. 7, Jul. 2003.

Bin Sheng, et al., "An Implemented Architecture of Deblocking Filter for H.264/AVC" Conference Proceedings, $11_{th}$ IEEE International Conference on Image Processing (ICIP 2004), Singapore, Oct. 24-27, 2004.

Jan Richardson, Videocoding H.264 and Mpeg-4 standards of new generation, 2005, Technosfera, Moscow, Translation of edition 2003.

Joint Video Team (JVT) of ISO/IEC MPEG and ITU-T VCEG, JVT-C167, Text of Committee Draft of Joint Specification (ITU-T Rec. H.264/ ISO/IEC 14496-10 AVC) 3rd Meeting: Fairfax, USA, May 6-10, 2002, pp. 58-62.

PCT International Search Report—PCT/KR2005/004568.

PCT Notification of Transmittal of the International Search Report and the Written Opinion of the International Searching Authority, or the Declaration, Dated Apr. 7, 2006.

Canadian Office Action issued on Sep. 7, 2011 by the Canadian Intellectual Property Office in counterpart Canadian Patent Application No. 2592515.

* cited by examiner

DEBLOCKING CONTROL METHOD CONSIDERING INTRA BL MODE AND MULTILAYER VIDEO ENCODER/DECODER USING THE SAME

CROSS-REFERENCE TO RELATED APPLICATIONS

This application claims priority from Korean Patent Application No. 10-2005-0008136 filed on Jan. 28, 2005 in the Korean Intellectual Property Office, and U.S. Provisional Patent Application No. 60/641,004 filed on Jan. 4, 2005 in the United States Patent and Trademark Office, the disclosures of which are incorporated herein by reference in their entirety.

BACKGROUND OF THE INVENTION

1. Field of the Invention

The present invention relates to a video compression technology, and more particularly to a deblocking filter used in a multilayer video encoder/decoder.

2. Description of the Prior Art

With the development of information and communication technologies, multimedia communications are increasing in addition to text and voice communications. The existing text-centered communication systems are insufficient to satisfy consumers' diverse desires, and thus multimedia services that can accommodate diverse forms of information such as text, image, music, and others, are increasing. Since multimedia data is massive, mass storage media and wide bandwidths are required for storing and transmitting the multimedia data. Accordingly, compression coding techniques are required to transmit the multimedia data, which includes text, images and audio data.

The basic principle of data compression is to remove data redundancy. Data can be compressed by removing spatial redundancy such as a repetition of the same color or object in images, temporal redundancy such as little change of adjacent frames in moving image frames or continuous repetition of sounds in audio, and a visual/perceptual redundancy, which considers the human beings' visual and perceptive insensitivity to high frequencies. In a general video coding method, the temporal redundancy is removed by temporal filtering based on motion compensation, and the spatial redundancy is removed by a spatial transform.

In order to transmit multimedia after the data redundancy is removed, transmission media are required, the performances of which differ. Presently used transmission media have diverse transmission speeds. For example, an ultrahigh-speed communication network can transmit several tens of megabits of data per second and a mobile communication network has a transmission speed of 384 kilobits per second. In order to support the transmission media in such a transmission environment and to transmit multimedia with a transmission rate suitable for the transmission environment, a scalable data coding method is most suitable.

This coding method makes it possible to perform a partial decoding of one compressed bit stream at a decoder or pre-decoder end, according to the bit rate, error rate, and system resource conditions. The decoder or pre-decoder can restore a multimedia sequence having a differing picture quality, resolution or frame rate by adopting only a part of the bit stream coded by the scalable coding method.

With respect to such scalable video coding, MPEG-21 (Moving Picture Experts Group-21) PART-13 has already progressed its standardization work. Particularly, much research for implementing scalability in a video coding method based on a multilayer has been done. As an example of such multilayered video coding, a multilayer structure is composed of a base layer, a first enhanced layer and a second enhanced layer, and the respective layers have different resolutions QCIF, CIF and 2CIF, and different frame rates.

FIG. 1 illustrates an example of a scalable video codec using a multilayer structure. In this video codec, the base layer is set to QCIF (Quarter Common Intermediate Format) at 15 Hz (frame rate), the first enhanced layer is set to CIF (Common Intermediate Format) at 30 Hz, and the second enhanced layer is set to SD (Standard Definition) at 60 Hz.

In encoding such a multilayered video frame, the correlation among the layers may be used. For example, a certain area 12 of the video frame of the first enhanced layer is efficiently encoded through prediction from the corresponding area 13 of the video frame of the base layer. In the same manner, an area 11 of the video frame of the second enhanced layer can be efficiently encoded through prediction from the area 12 of the first enhanced layer. If the respective layers of the multilayered video frame have different resolutions, the image of the base layer should be up-sampled before the prediction is performed.

In the present MPEG-21 scalable video coding standard (hereinafter referred to as the SVC standard), research is under way for implementing the multilayered video codec as in the example illustrated in FIG. 1, based on the existing H.264/AVC (Advanced Video Coding).

However, H.264 uses a DCT transform as a spatial transform method, and in a DCT-based codec undesirable blocking artifacts and blocking effect occur as the compression rate is increased. There are two causes of the blocking artifacts.

The first cause is the block-based integer DCT transform. This is because discontinuity occurs at a block boundary due to the quantization of DCT coefficients resulting from the DCT transform. Since H.264 uses a 4×4 size DCT transform, which is a relatively small size, the discontinuity problem may be somewhat reduced, but it cannot be totally eliminated.

The second cause is the motion compensation prediction. A motion-compensated block is generated by copying pixel data interpolated from another position of a different reference frame. Since these sets of data do not accurately coincide with each other, a discontinuity occurs at the edge of the copied block. Also, during the copying process, this discontinuity is transferred to the motion-compensated block.

Recently, several technologies for solving the blocking effect have been developed. In order to reduce the blocking effect, H.263 and MPEG-4 have proposed an overlapped block motion compensation (OBMC) technique. Even though the OBMC is effective at reducing the blocking artifacts, it has the problem that it requires a great amount of computation for the motion prediction, which is performed at the encoder end. Accordingly, H.264 uses a deblocking filter in order to remove the blocking artifacts and to improve the picture quality.

The blocking filter process is performed at the encoder or decoder end before the macroblock is restored and after the inverse transform thereof is performed. In this case, the strength of the deblocking filter can be adjusted to suit various conditions.

FIG. 2 is a flowchart explaining a method for deciding the deblocking filter strength according to the conventional H.264 standard. Here, block q and block p are two blocks that define a block boundary to which the deblocking filter will be applied, and represent the present block and a neighboring block. Five kinds of filter strengths (indicated as Bs=0 to 4) are set according to whether the block p or q is an intra-coded block, whether a target sample is located on a macro-block boundary, whether the block p or q is a coded-block, and others. If Bs=0, it means that the deblocking filter is not applied to the corresponding target pixel.

In other words, according to the conventional method to decide the deblocking filter strength, the filter strength is based on whether the present block, in which the target sample exists, and the neighboring block are intra-coded, inter-coded, or uncoded. The filter strength is also based on whether the target sample exists at the boundary of a 4×4 block or at the boundary of a 16×16 block.

Although the presently proceeding SVC standard adopts a technology that predicts a frame at the present layer using a frame generated at the lower layer, as illustrated in FIG. 1, i.e., an intra BL (Base Layer) mode, it follows the conventional H.264 standard, as illustrated in FIG. 2, when deciding the deblocking filter strength.

However, since the deblocking filter is applied to layers in the video encoder/decoder based on a multilayer, it is unreasonable to strongly apply the deblocking filter again to the frame provided from the lower layer in order to efficiently predict the present layer frame. Nevertheless, in the present SVC standard, the intra BL mode is included as a kind of intra coding and the method for deciding the filter strength, as illustrated in FIG. 2, is applied as is. No consideration is given to whether the present block belongs to the intra BL macroblock when deciding the filter strength.

It is known that the picture quality of the restored video is greatly improved when the filter strength is suitable to the respective conditions and the deblocking filter is applied at a suitable filter strength. Accordingly, it is necessary to research techniques that properly decide the filter strength in consideration of the intra BL mode during the multilayered video encoding/decoding operation.

SUMMARY OF THE INVENTION

Accordingly, the present invention has been made to address the above-mentioned problems occurring in the prior art, and an aspect of the present invention is to give a proper deblocking filter strength according to whether a certain block to which the deblocking filter will be applied uses an intra BL mode in a video encoder/decoder based on a multilayer.

Additional advantages, objects and features of the invention will be set forth in part in the description which follows and in part will become apparent to those having ordinary skill in the art upon examination of the following or may be learned from practice of the invention.

In order to accomplish these objects, there is provided a method for deciding a deblocking filter strength, according to embodiments of the present invention, comprising (a) deciding a present block for which a deblocking filtering will be performed and its neighboring block, (b) judging whether the present block and the neighboring block are coded by an intra BL mode and (c) deciding the deblocking filter strength according to a result of judgment.

In another aspect of the present invention, there is provided a deblocking filtering method comprising (a) deciding a present block for which a deblocking filtering will be performed and its neighboring block, (b) judging whether the present block and the neighboring block are coded by an intra BL mode, (c) deciding a deblocking filter strength according to a result of judgment and (d) performing the deblocking filtering with respect to a boundary between the present block and the neighboring block according to the deblocking filter strength.

In still another aspect of the present invention, there is provided a video encoding method based on a multilayer comprising (a) encoding an input video frame, (b) decoding the encoded frame, (c) deciding a deblocking filter strength according to whether a block constituting the decoded frame is coded by an intra BL mode and (d) performing a deblocking filtering with respect to a boundary between the block and its neighboring block according to the decided deblocking filter strength.

In still another aspect of the present invention, there is provided a video decoding method based on a multilayer comprising (a) restoring a video frame from an input bit stream, (b) deciding a deblocking filter strength according to whether a block constituting the restored frame is coded by an intra BL mode and (c) performing a deblocking filtering with respect to a boundary between the block and its neighboring block according to the decided deblocking filter strength.

In still another aspect of the present invention, there is provided a video encoder based on a multilayer comprising means for encoding an input video frame, means for decoding the encoded frame, means for deciding a deblocking filter strength according to whether a block constituting the decoded frame is coded by an intra BL mode and means for performing a deblocking filtering with respect to a boundary between the block and its neighboring block according to the decided deblocking filter strength.

In still another aspect of the present invention, there is provided a video decoder based on a multilayer comprising means for restoring a video frame from an input bit stream, means for deciding a deblocking filter strength according to whether a block constituting the restored frame is coded by an intra BL mode and means for performing a deblocking filtering with respect to a boundary between the block and its neighboring block according to the decided deblocking filter strength.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENTS

Figure 1:
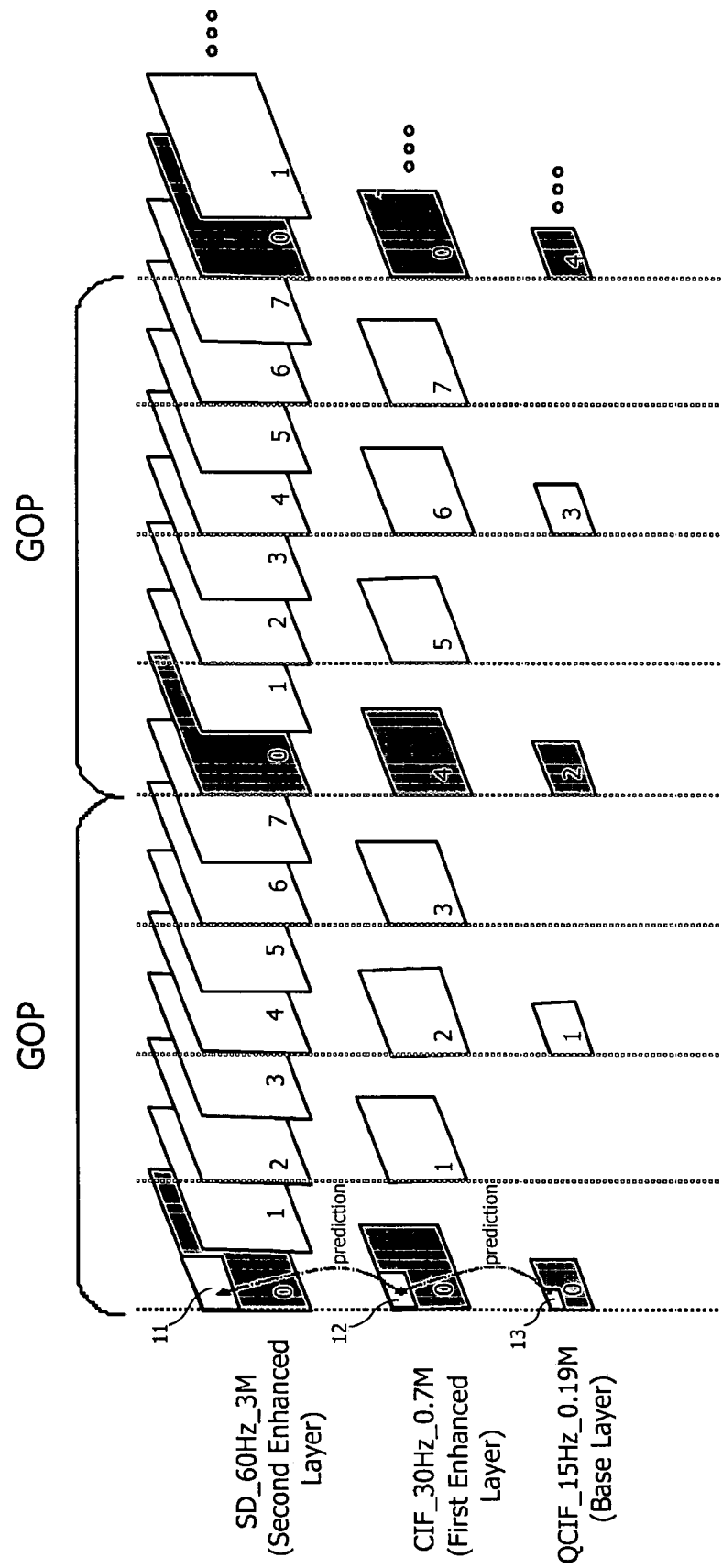
FIG. 1 is a view illustrating an example of a scalable video codec using a multilayer structure.

Hereinafter, exemplary embodiments of the present invention will be described in detail with reference to the accompanying drawings. The aspects and features of the present invention and methods for achieving the aspects and features will be apparent by referring to the embodiments to be described in detail with reference to the accompanying drawings. However, embodiments of the present invention are not limited to the embodiments disclosed hereinafter, but can be implemented in diverse forms. The matters defined in the description, such as the detailed construction and elements, are nothing but specific details provided to assist in a comprehensive understanding of the invention. Thus, embodiments of the present invention can be implemented without such limitations. In the following description of embodiments of the present invention, the same drawing reference numerals are used for the same elements across various figures.

Figure 2:
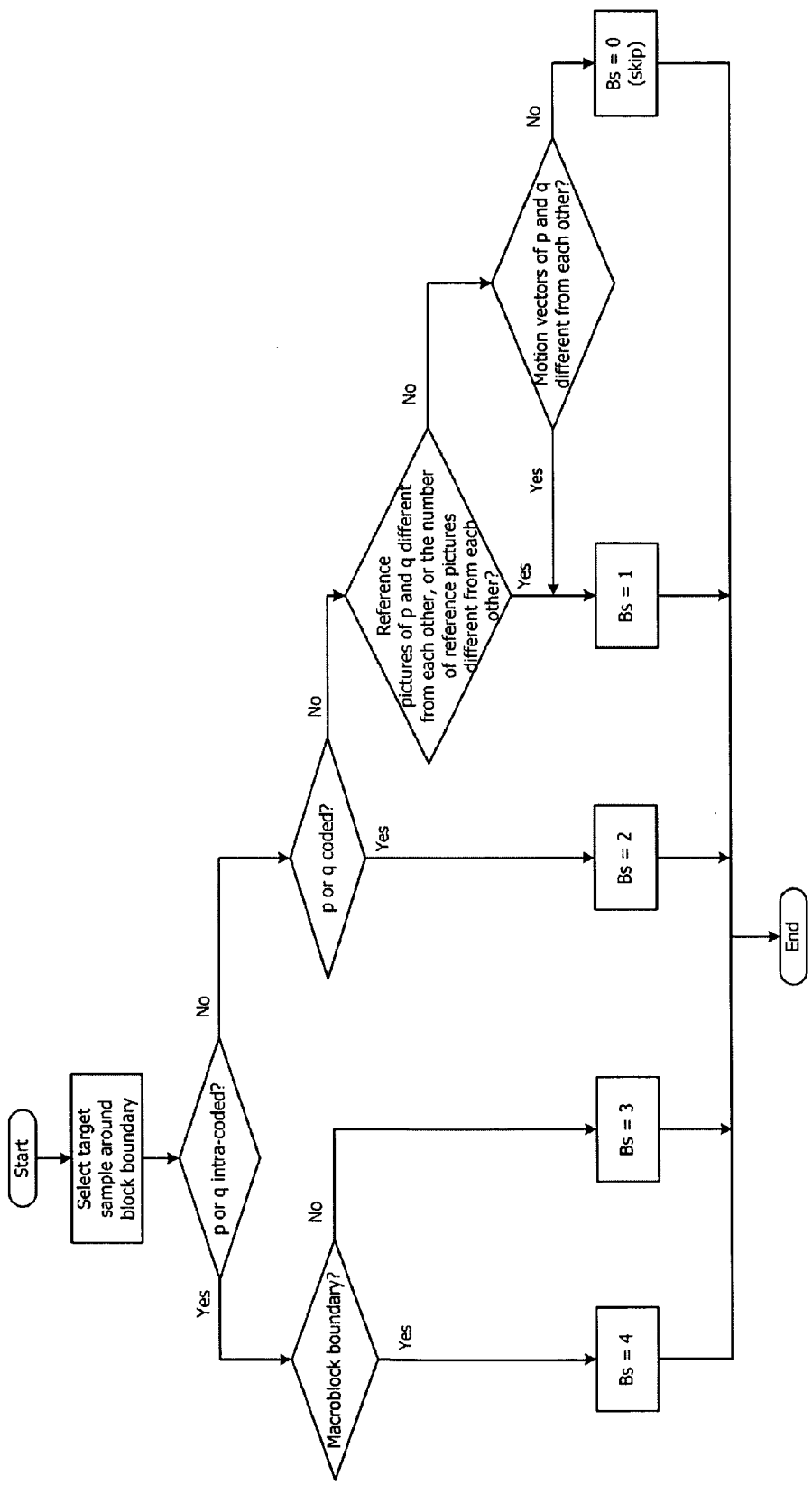
FIG. 2 is a flowchart illustrating a method for deciding the deblocking filter strength according to the conventional H.264 standard.
Figure 3:
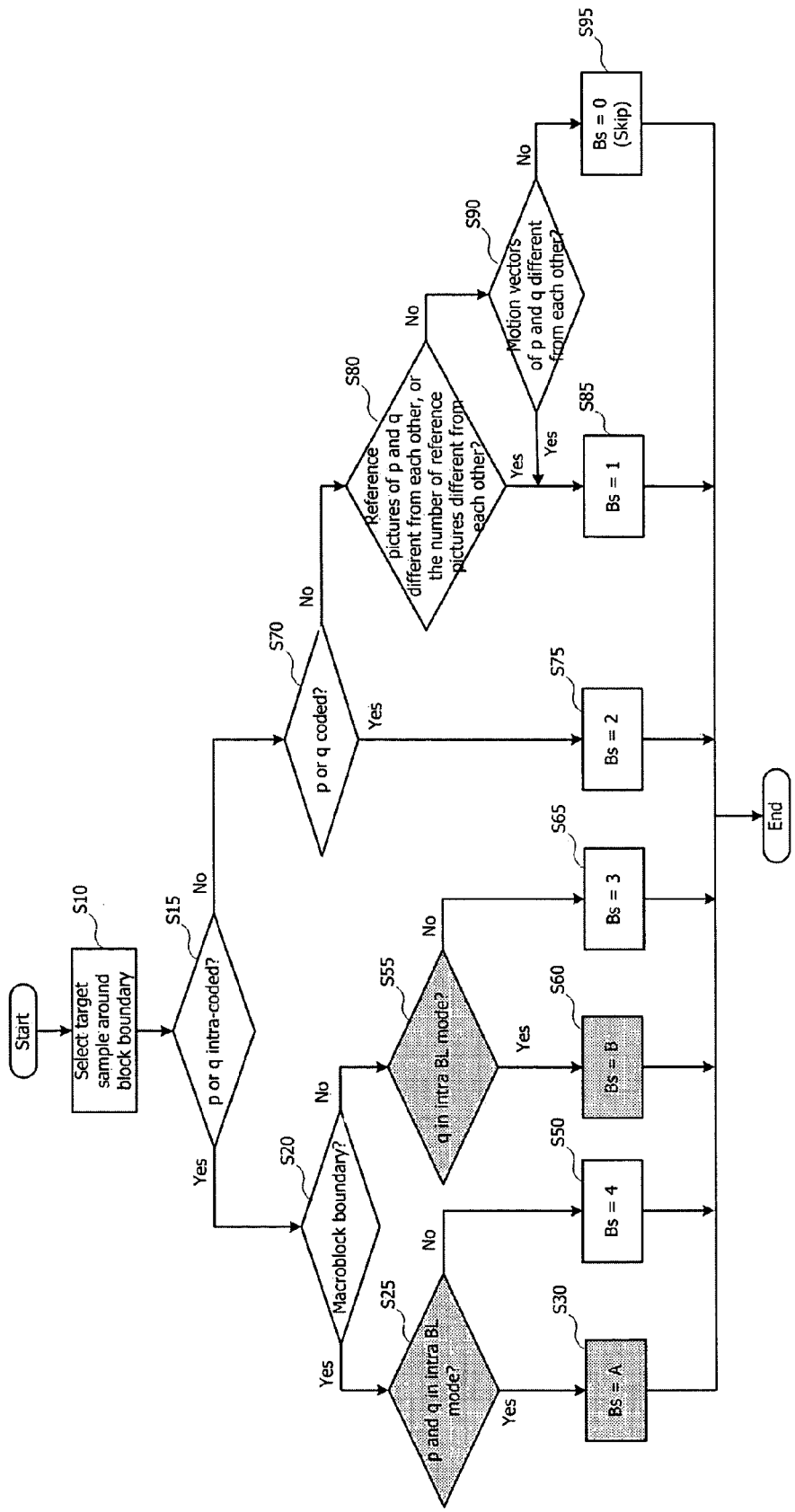
FIG. 3 is a flowchart illustrating a method for deciding the filter strength of a video coder based on a multilayer according to an embodiment of the present invention.

FIG. 3 is a flowchart illustrating a method for deciding the filter strength of a video coder based on a multilayer according to an embodiment of the present invention. In the following description, the term 'video coder' is used as the common designation of a video encoder and a video decoder. The method according to the embodiment of the present invention, as illustrated in FIG. 3, may additionally include S25, S30, S55 and S60 in comparison to the conventional method, as illustrated in FIG. 2.

Figure 4:
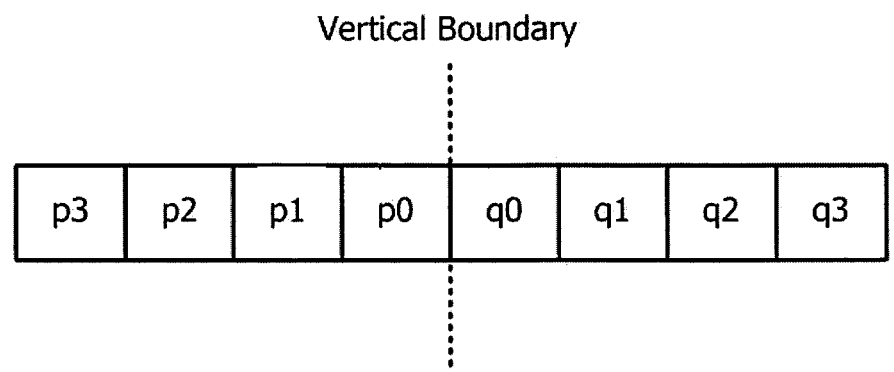
FIG. 4 is a view illustrating a vertical boundary and target samples of a block.
Figure 5:
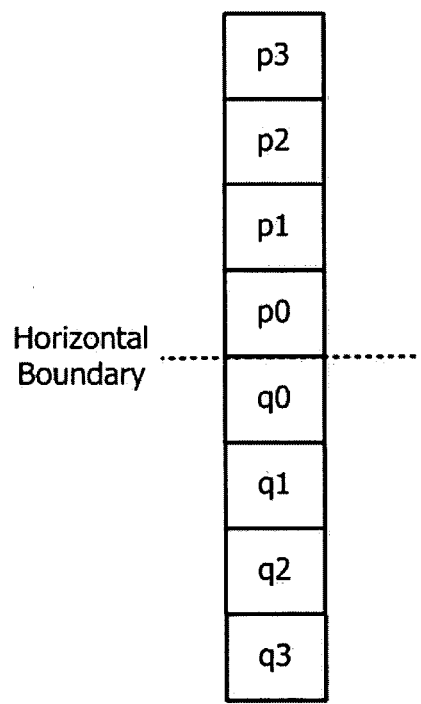
FIG. 5 is a view illustrating a horizontal boundary and target samples of a block.
Figure 6:
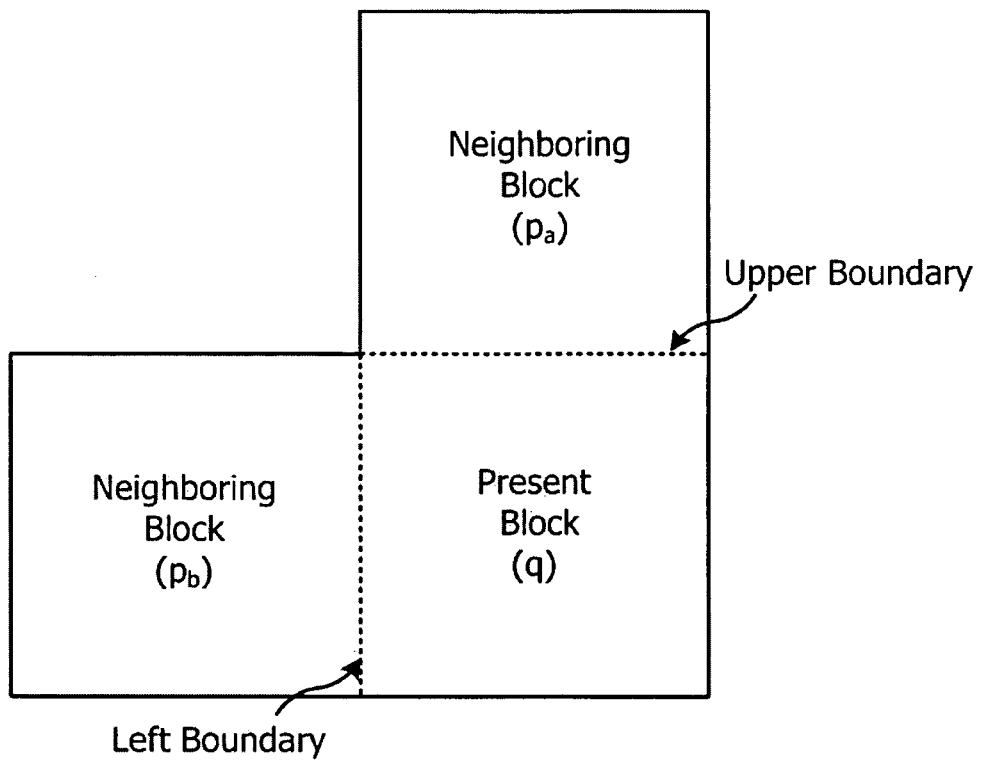
FIG. 6 is a view illustrating the positional correlation of the present block q with its neighboring blocks $p_a$ and $p_b$.

First, target samples are selected around the boundary of a block (for example, a 4×4 pixel block). The target samples means a set of samples arranged as shown in FIG. 4 or FIG. 5 around the boundary between the present block q and its neighboring block p. As shown in FIG. 6, with consideration to the order of block generation, the upper block and the left block of the present block q correspond to the neighboring blocks p ($P_a$ and $P_b$), and thus the targets to which the deblocking filter is applied are the upper boundary and the left boundary of the present block q. The lower boundary and the right boundary of the present block q are filtered during the next process for the lower block and the right block of the present block. In embodiments of the present invention, 4×4 blocks are exemplified since the 4×4 DCT transform is used in the H.264 standard and the minimum size of a variable block in motion prediction is 4×4 pixels. However, in the case of a video coder having different characteristics, that is, using a 8×8 DCT transform, it will be apparent to those skilled in the art that the filtering can also be applied to the block boundaries of 8×8 blocks and other block sizes.

Referring to FIG. 4, target samples appear around the left boundary of the present block q in the case where the block boundary is vertical. The target samples include four samples p0, p1, p2 and p3 on the left side of the vertical boundary line, which exist in the neighboring block p, and four samples q0, q1, q2 and q3 on the right side of the boundary line, which exist in the present block q. Although a total of four samples are subject to filtering, the number of reference samples and the number of filtered samples may be change according to the decided filter strength.

Referring to FIG. 5, target samples appear around the upper boundary of the present block q in the case where the block boundary is horizontal. The target samples include four samples p0, p1, p2 and p3 existing in the upper half of the horizontal boundary line (neighboring block p), and four samples q0, q1, q2 and q3 existing in the lower half of the horizontal boundary line (present block q).

According to the existing H.264 standard, the deblocking filter is applied to the luminance signal component and the chrominance signal component, respectively, and the filtering is successively performed in a raster scan order on a unit of a macroblock that constitutes one frame. With respect to the respective macroblocks, the filtering in the horizontal direction (as shown in FIG. 5) may be performed after the filtering in the vertical direction (as shown in FIG. 4) is performed, and vice versa.

Referring to FIG. 3, after S10, it is judged whether at least one of block p and block q, to which the target samples belong, is intra-coded S15. The reason why the intra-coded block is judged is that the intra coding that uses the similarity in the frame greatly heightens the block effect in comparison to the inter coding. Accordingly, the filter strength is relatively heightened when at least one of the block p and q is intra-coded in comparison to none of the them are intra-coded.

In embodiments of the present invention, intra coding may include both a coding according to a directional intra-prediction mode for predicting the present block from a certain part of a neighboring block of a frame, and coding according to an "intra BL mode" for predicting the present macroblock from an image restored from the lower layer of the present layer.

If block p and/or block q are intra-coded as a result of the decision of S15, it is then judged whether the block boundary coincides with the macroblock boundary S20. Since the block effect of the macroblock boundary appears higher than that of the 4×4 block boundary, the filter strength may be increased due to a decision in S20.

If the block boundary coincides with the macroblock boundary as a result of the decision of S20, it is judged whether block p and block q are in the intra BL mode S25. If so, the value that indicates the filter strength (hereinafter referred to as "Bs") may be set to 'A' S30; if not, Bs may be set to '4' S50. In one embodiment of the present invention, Bs may be set to '4' if even one of block p and block q is not in the BL mode.

The value 'A' should be smaller than the value selected if the answer in S25 is 'No', that is, '4'. This is because since the deblocking filter has already been applied to the image of the base layer that is provided to use the intra BL mode, it is unreasonable to apply to the image the filter having the same strength as other intra prediction modes. Accordingly, although 'A' may be 0, 1, 2, or 3, it has been confirmed by experiments that it is preferable that 'A' be '1'.

If the block boundary does not coincide with the macroblock boundary as a result of the decision in S20, it is judged whether the block q has been coded by the intra BL mode S55. If so, Bs may be set to 'B' S60; if not, Bs may be set to '3' S65. For the same reason as the setting of the value 'A', Bs should be smaller than the value selected if the answer in S55 is 'No', that is, '3'. Accordingly, although 'B' may be 0, 1, or 2, it has been confirmed by experiments that it is preferable that 'B' be '1'.

If it is judged that block p or block q has not been intra-coded in S15, it is then judged whether block p or block q has been coded S70. In general, blocks that are not intra-coded are inter-coded through inter prediction. However, according to the H.264 standard, if the difference between the predicted image and the present image is lower than a specified threshold value as a result of inter prediction, the technique that does not code the difference is used, and thus the judgment of S70 is required. This is because the possibility that the block effect has occurred is low in comparison to the case where the blocks are coded, and thus, it is preferable to apply a relatively low filter strength in this case.

If either block p or block q is coded as a result of the judgment of S70, Bs is set to '2' S75. However, if the reference frames of block p and block q are different or the numbers of the reference frames are different in a state where neither of the blocks has been coded (which corresponds to 'Yes' in S80, Bs is set to '1' S85. This is because the fact that the blocks p and q have different reference frames means that the possibility that the block effect has occurred is relatively high.

If the reference frames of the blocks p and q are not different or the numbers of the reference frames between them are not different (which corresponds to 'No' in S80) as a result of judgment in S80, it is judged whether motion vectors of block p and block q are different S90. This is because since in the case in which the motion vectors do not coincide with each other, although both blocks have the same reference frames (which corresponds to 'No' in S80), the possibility that the block effect has occurred is relatively high in comparison to the case in which the motion vectors coincide with each other, and thus, it is preferable to apply different filter strengths according to the result of judgment in S90.

If the motion vectors of block p and block q are different in S90 (which corresponds to 'Yes' in S90), Bs is set to '1' S85; if not, Bs is set to '0' S95.

Figure 7:
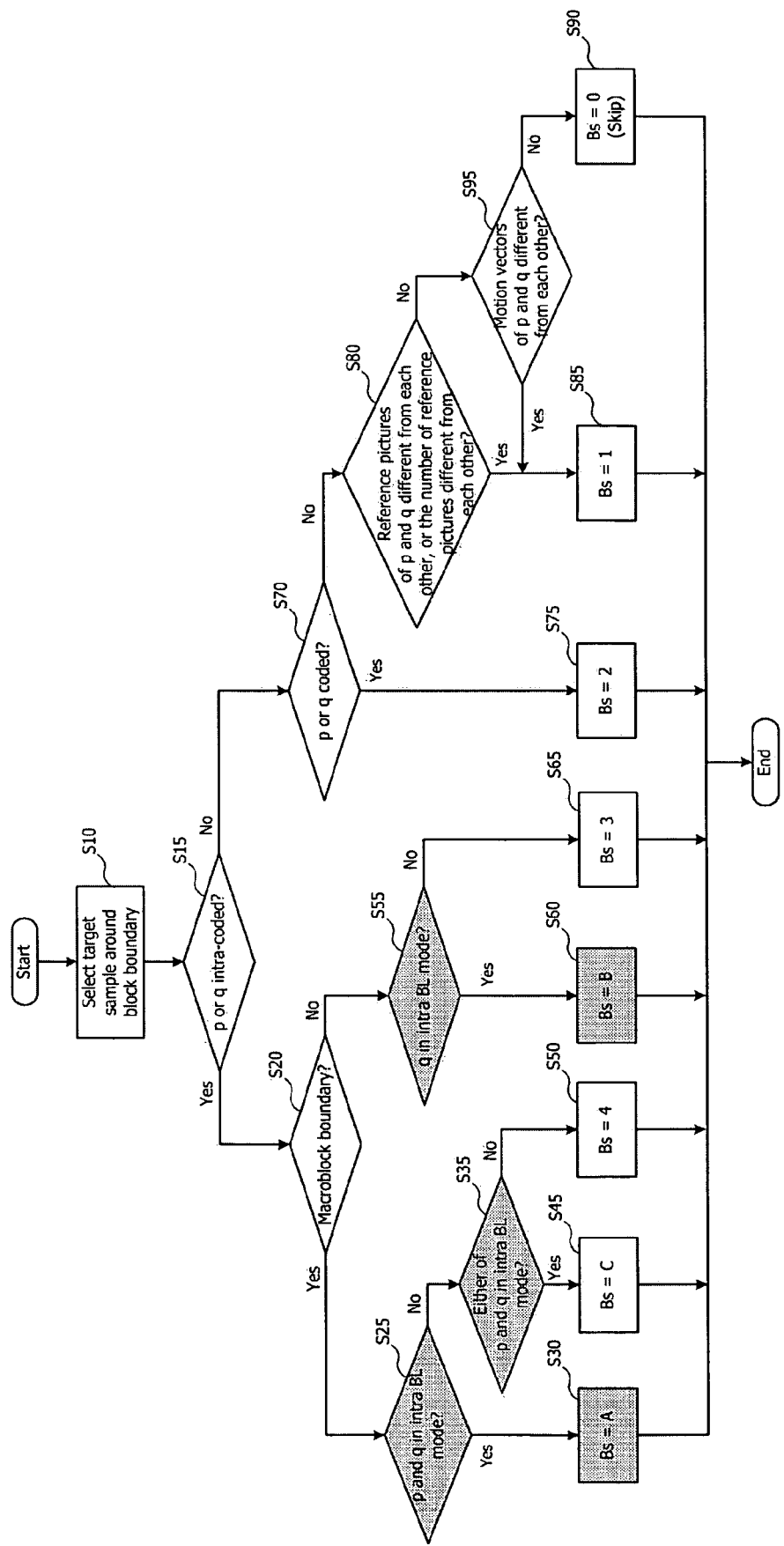
FIG. 7 is a flowchart illustrating a method for deciding the filter strength of a video coder based on a multilayer according to another embodiment of the present invention.

FIG. 7 is a flowchart illustrating a method of a video coder based on a multilayer for deciding the filter strength according to another embodiment of the present invention. Although in the embodiment of FIG. 3 it is judged in S25 whether both block p and block q are in the intra BL mode, in the embodiment of FIG. 7 it is judged whether either of block p or block q is in the intra BL mode in addition to whether both block p and block q are in the intra BL mode so as to apply different filter strengths to the cases, respectively.

Since other parts of the embodiment of FIG. 7 are similar to those of the embodiment of FIG. 3, only the parts of FIG. 7 that are different from those of the embodiment of FIG. 3 will be explained in the following.

If both block p and block q are in the intra BL mode in S25 (which corresponds to 'Yes' in S25), Bs may be set to 'A' as in the embodiment of FIG. 3 S30. However, if only one of block p and block q is in the intra BL mode (which corresponds to 'Yes' in S35), Bs may be set to a new value 'C' S45. Meanwhile, if either block p or block q is not in the intra BL mode (which corresponds to 'No' in S35), Bs may be set to '4' in the same manner as in the embodiment of FIG. 3 S50.

Since 'C' refers to the case in which only one of the blocks is in the intra BL mode, the filter strength should be set to a value that is larger than 'A' but is smaller than '4'. If 'A' is set to '1' as in FIG. 3, then 'C' should have a value of '2' or '3'.

Figure 8:
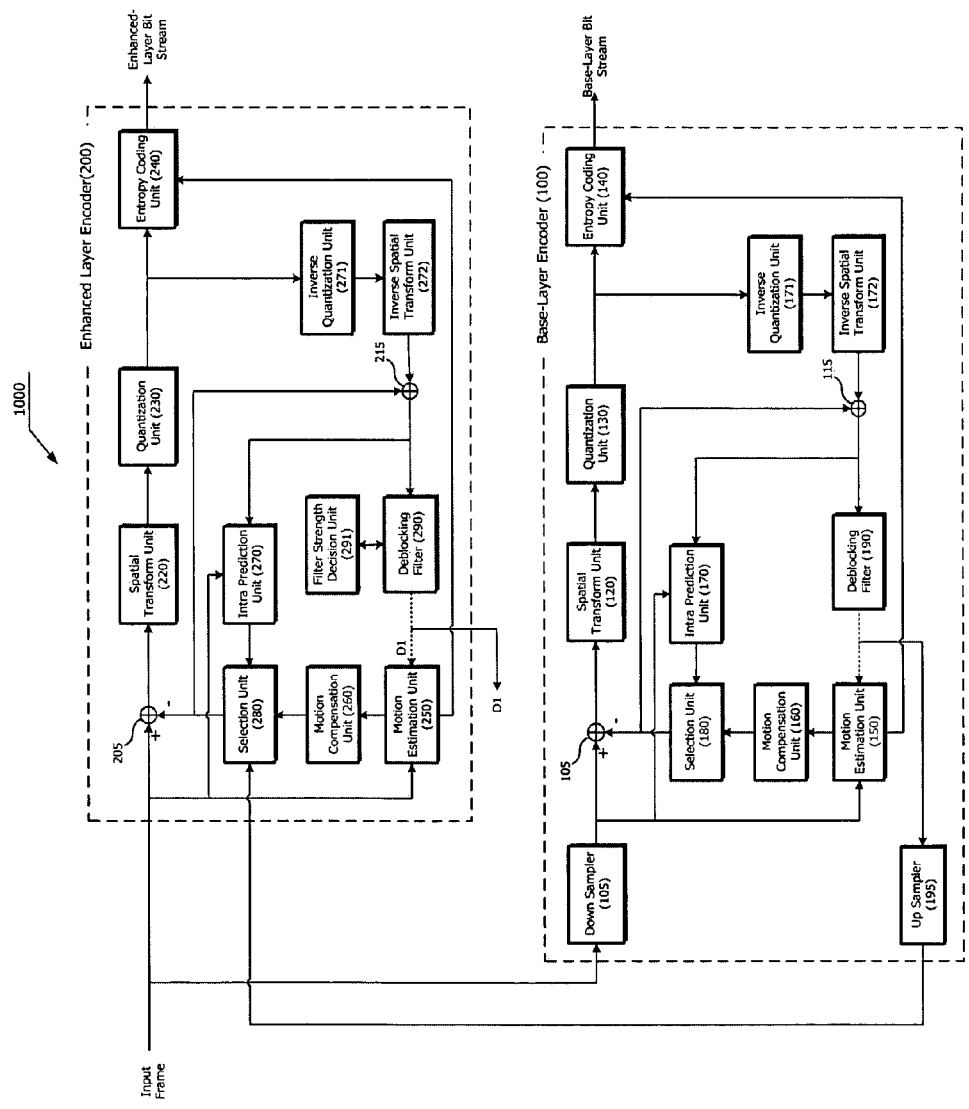
FIG. 8 is a block diagram illustrating the construction of an open loop type video encoder according to an embodiment of the present invention.

Meanwhile, FIG. 8 is a block diagram illustrating the construction of a video encoder based on a multilayer that includes a deblocking filter according to the method for deciding the filter strength. The video encoder based on a multilayer may be implemented as a closed-loop type or an open-loop type. Here, the closed-loop type video encoder performs a prediction with reference to the original frame, and the open-loop type video encoder performs a prediction with reference to a restored frame.

A selection unit 280 selects and outputs one of a signal transferred from an up sampler 195 of a base-layer encoder 100, a signal transferred from a motion compensation unit 260 and a signal transferred from an intra prediction unit 270. This selection is performed by selecting from an intra BL mode, an inter prediction mode and an intra prediction mode, that has the highest coding efficiency.

An intra prediction unit 270 predicts an image of the present block from an image of a restored neighboring block provided from an adder 215 according to a specified intra prediction mode. H.264 defines such an intra prediction mode, which includes eight modes having directions and one DC mode. Selection of one mode among them is performed by selecting the mode that has the highest coding efficiency. The intra prediction unit 270 provides predicted blocks generated according to the selected intra prediction mode to an adder 205.

A motion estimation unit 250 performs motion estimation on the present macroblock of input video frames based on the reference frame and obtains motion vectors. An algorithm that is widely used for the motion estimation is a block matching algorithm. This block matching algorithm estimates a vector that has the minimum error in a specified search area of the reference frame as a motion vector. The motion estimation may be performed using a motion block of a fixed size or using a motion block having a variable size according to the hierarchical variable size block matching (HVSBM) algorithm. The motion estimation unit 250 provides motion data such as the motion vectors obtained as a result of motion estimation, the mode of the motion block, the reference frame number, and others, to an entropy coding unit 240.

A motion compensation unit 260 performs motion compensation using the motion vector calculated by the motion estimation unit 250 and the reference frame and generates an inter-predicted image for the present frame.

A subtracter 205 generates a residual frame by subtracting a signal selected by the selection unit 280 from the present input frame signal.

A spatial transform unit 220 performs a spatial transform of the residual frame generated by the subtracter 205. DCT (Discrete Cosine Transform), wavelet transform, and others may be used as the spatial transform method. Transform coefficients are obtained as a result of spatial transform. In the case of using the DCT as the spatial transform method, DCT coefficients are obtained, and in the case of using the wavelet transform method, wavelet coefficients are obtained.

A quantization unit 230 generates quantization coefficients by quantizing the transform coefficients obtained by the spatial transform unit 220. The quantization means representing the transform coefficients expressed as real values by discrete values by dividing the transform values at predetermined intervals. Such a quantization method may be a scalar quantization, vector quantization, or others. The scalar quantization method is performed by dividing the transform coefficients by corresponding values from a quantization table and rounding the resultant values off to the nearest whole number.

In the case of using the wavelet transform as the spatial transform method, an embedded quantization method is mainly used as the quantization method. This embedded quantization method performs an efficient quantization using the spatial redundancy by preferentially coding components of the transform coefficients that exceed a threshold value by changing the threshold value (to ½). The embedded quantization method may be the Embedded Zerotrees Wavelet Algorithm (EZW), Set Partitioning in Hierarchical Trees (SPIHT), or Embedded ZeroBlock Coding (EZBC).

The coding process before the entropy coding as described above is called lossy coding.

The entropy coding unit 240 performs a lossless coding of the quantization coefficients and motion information provided by the motion estimation unit 250 and generates an output bit stream. Arithmetic coding or variable length coding may be used as the lossless coding method.

Figure 9:
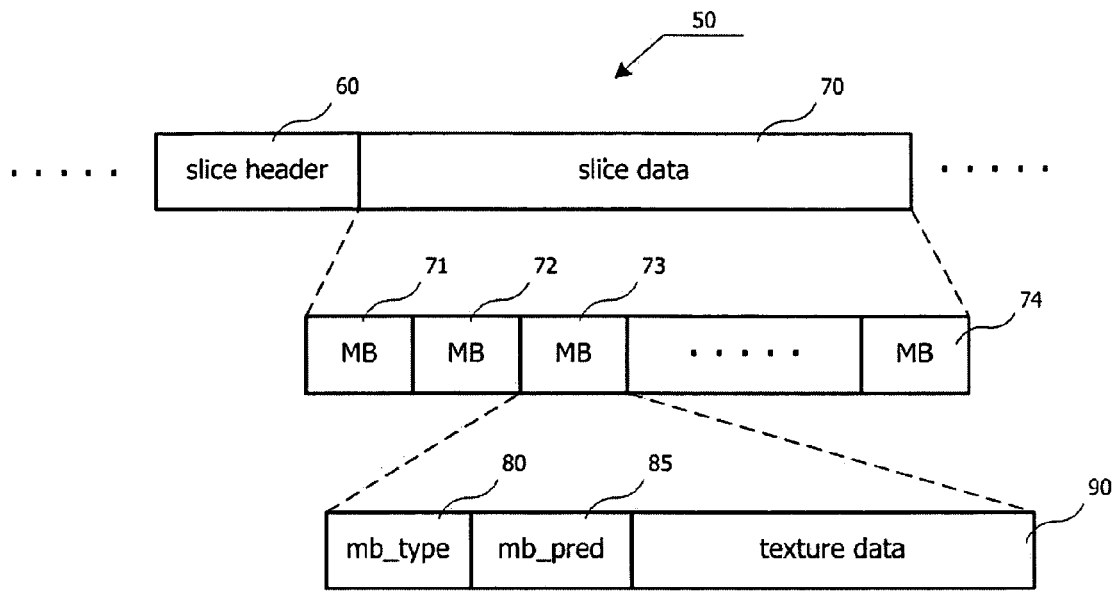
FIG. 9 is a view illustrating the structure of a bit stream generated according to an embodiment of the present invention.

FIG. 9 is a view illustrating an example of the structure of a bit stream 50 generated according to an embodiment of the present invention. In H.264, the bit stream is coded in the unit of a slice. The bit stream 50 includes a slice header 60 and slice data 70, and the slice data 70 is composed of a plurality of macroblocks (MBs) 71 to 74. Macroblock data, for example, macroblock 73, are composed of an mb_type field 80, an mb_pred field 85 and a texture data field 90.

In the mb_type field 80, a value indicating the kind of macroblock is recorded. That is, this field indicates whether the present macroblock is an intra macroblock, inter macroblock or intra BL macroblock.

In the mb_pred field 85, a detailed prediction mode according to the kind of the macroblock is recorded. In the case of the intra macroblock, the selected intra prediction mode is recorded, and in the case of the inter macroblock, a reference frame number and a motion vector by macroblock partitions are recorded.

In the texture data field 90, the coded residual frame, i.e., texture data, is recorded.

Referring to FIG. 8, an enhanced-layer encoder 2 further includes an inverse quantization unit 271, an inverse DCT transform unit 272 and an adder 215, which are used to restore the lossy-coded frame by inversely decoding it.

The inverse quantization unit 271 inversely quantizes the coefficients quantized by the quantization unit 230. This inverse quantization process is the inverse process of the quantization process. The inverse spatial transform unit 272 performs an inverse transform of the quantized results and provides the inversely-transformed results to the adder 215.

The adder 215 restores the video frame by adding a signal provided from the inverse spatial transform unit 272 to a predicted signal selected by the selection unit 280 and stored in a frame buffer (not illustrated). The video frame restored by the adder 215 is provided to a deblocking filter 290, and the image of the neighboring block of the restored video frame is provided to the intra prediction unit 270.

Figure 10:
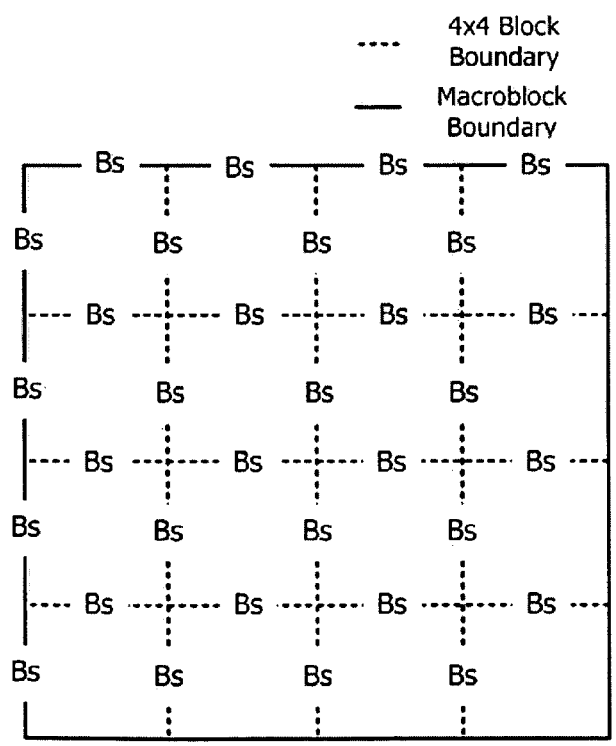
FIG. 10 is a view illustrating boundaries of a macroblock and blocks with respect to a luminance component.
Figure 11:
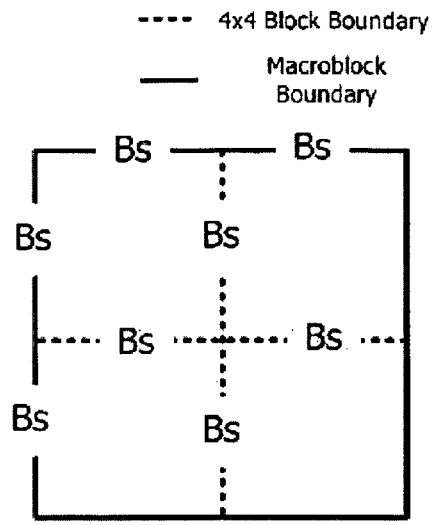
FIG. 11 is a view illustrating boundaries of a macroblock and blocks with respect to a chrominance component.

A filter strength decision unit 291 decides the filter strength with respect to the macroblock boundary and the block (for example, a 4×4 block) boundaries in one macroblock according to the filter strength decision method as explained with reference to FIG. 3 and FIG. 7. In the case of a luminance component, the macroblock has a size of 16×16 pixels, as illustrated in FIG. 10, and in the case of a chrominance component, the macroblock has a size of 8×8 pixels, as illustrated in FIG. 11. In FIGS. 10 and 11, 'Bs' is marked on the boundary of blocks that belong to a macroblock. However, 'Bs' is not marked on the right boundary line and the lower boundary line of the macroblock. If no macroblock exists to the right or below the present macroblock, the deblocking filter for the corresponding part is unnecessary, while if a macroblock exists to the right or below the present macroblock, the filter strength of the boundary lines is decided during the deblocking filtering process of the corresponding macroblock.

Figure 12:
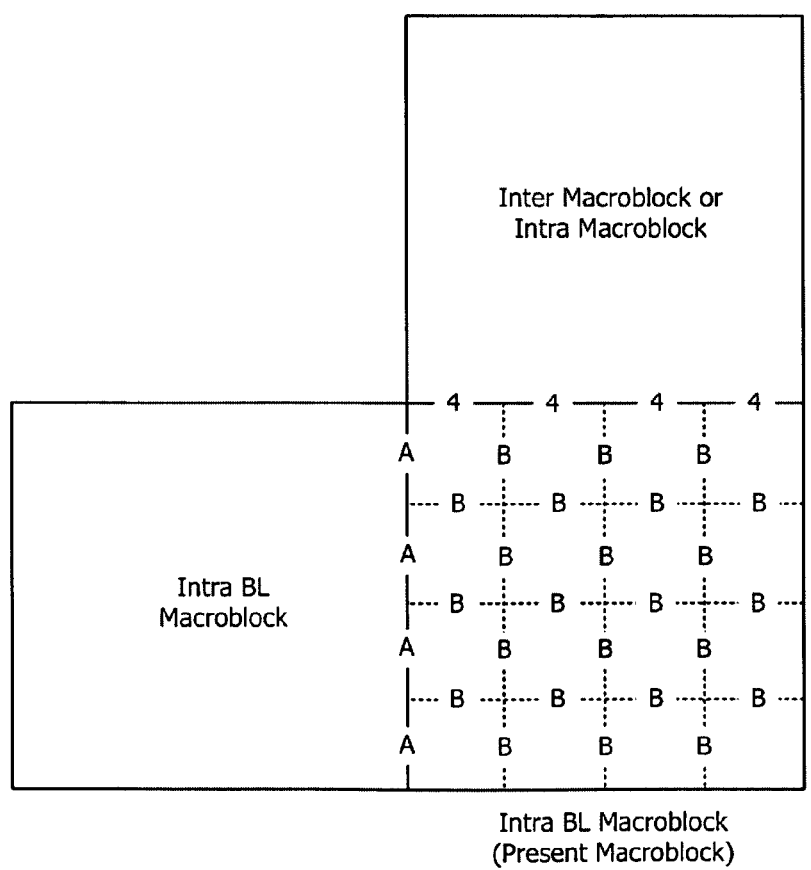
FIG. 12 is a view illustrating an example of macroblocks with the filter strengths set by boundaries thereof.

An example of the filter strength decision with respect to several boundary lines of a luminance-component macroblock as illustrated in FIG. 10 is illustrated in FIG. 12. Referring to FIG. 12, the present macroblock and the left macroblock are intra BL macroblocks and the upper macroblock is an inter macroblock (or intra macroblock).

On the basis of the embodiment of FIG. 3, the filter strength of all the 4×4 block boundary lines in the macroblock may be set to 'B', and the filter strength of the boundary lines (i.e., the left boundary line of the present macroblock) between the present macroblock and the left intra macroblock may be set to 'A'. Also, the filter strength of the upper boundary of the present macroblock may be set to '4'.

On the basis of the embodiment of FIG. 7, the filter strength of all the upper boundary lines of the present macroblock may be set to 'C', unlike the filter strength marked in FIG. 12.

The deblocking filter 290 actually performs the deblocking filtering with respect to the respective boundary lines according to the filter strength decided by the filter strength decision unit 291. Referring to FIGS. 4 and 5, on both sides of the vertical boundary or the horizontal boundary, four pixels are indicated. The filtering operation can affect three pixels on each side of the boundary, i.e., {p2, p1, p0, q0, q1, q2}, at maximum. This is decided with consideration to the filter strength Bs, quantization parameter QP of the neighboring block, and other parameters.

However, in the deblocking filtering, it is very important to discriminate the real edge existing in the picture from the edge generated by quantizing the DCT coefficients. In order to keep the distinction of the image, the real edge should remain without being filtered as much as possible, but the artificial edge should be filtered to be imperceptible. Accordingly, the filtering is performed only when all conditions of Equation (1) are satisfied.

$$Bs \neq 0, \ |p0-q0|<\alpha, \ |p1-p0|<\beta, \ |q1-q0|<\beta \quad (1)$$

Here, $\alpha$ and $\beta$ are threshold values determined according to the quantization parameter, FilterOffsetA, FilterOffsetB, and others.

If Bs is '1', '2' or '3' and a 4-tab filter is applied to inputs p1, p0, q0 and q1, filtered outputs will be P0 (which is the result of filtering p0) and Q0 (which is the result of filtering q0). With regards to the luminance component, if $|p2-p0|<\beta$, the 4-tab filter is applied to the inputs p2, p1, p0 and q0, and the filtered output is P1 (which is the result of filtering p1). In the same manner, if $|q2-q0|<\beta$, the 4-tab filter is applied to the inputs q2, q1, q0 and p0, and the filtered output is Q1 (which is the result of filtering q1).

Meanwhile, if Bs is '4', a 3-tab filter, a 4-tab filter or a 5-tab filter is applied to the inputs and P0, P1 and P2 (which are the results of filtering p0, p1, p2) and Q0, Q1 and Q2 (which are the results of filtering q0, q1, q2) can be outputted based on the threshold values $\alpha$ and $\beta$ and eight actual pixels.

More detailed information about the deblocking filtering process is disclosed in "Draft ITU-T Recommendation and Final Draft International Standard of Joint Video Specification (ITU-T Rec. H.264|ISO/IEC 14496-10 AVC), Pattaya, Thailand, 7-14 Mar. 2003."

Referring to FIG. 8, a resultant frame D1 filtered by the deblocking filter 290 is provided to the motion estimation unit 250 to be used for the inter prediction of other input frames.

Also, if an enhanced layer above the present enhanced layer exists, the frame D1 may be provided as a reference frame when the prediction of the intra BL mode is performed on the upper enhanced layer.

However, the output D1 of the deblocking filter is inputted to the motion estimation unit 250 only in the case of the closed-loop type video encoder. In the case of the open-loop type video encoder such as a video encoder based on MCTF (Motion Compensated Temporal Filtering), the original frame is used as the reference frame during the inter prediction, and thus it is not required that the output of the deblocking filter be inputted to the motion estimation unit 250 again.

The base-layer encoder 100 may include a spatial transform unit 120, a quantization unit 130, an entropy coding unit 140, a motion estimation unit 150, a motion compensation unit 160, an intra prediction unit 170, a selection unit 180, an inverse quantization unit 171, an inverse spatial transform unit 172, a down sampler 105, an up sampler and a deblocking filter 190.

The down sampler 105 performs a down sampling of the original input frame to the resolution of the base layer, and the up sampler 195 performs an up sampling of the filtered output of the deblocking filter 190 and provides the up-sampled result to the selection unit 280 of the enhanced layer.

Since the base-layer encoder 100 cannot use information of a lower layer, the selection unit 180 selects one of the intra-predicted signal and the inter-predicted signal, and the deblocking filter 190 decides the filter strength in the same manner as in the conventional H.264.

Since operations of other constituent elements are the same as those of the constituent elements existing in the enhanced-layer encoder 200, the detailed explanation thereof will be omitted.

Figure 13:
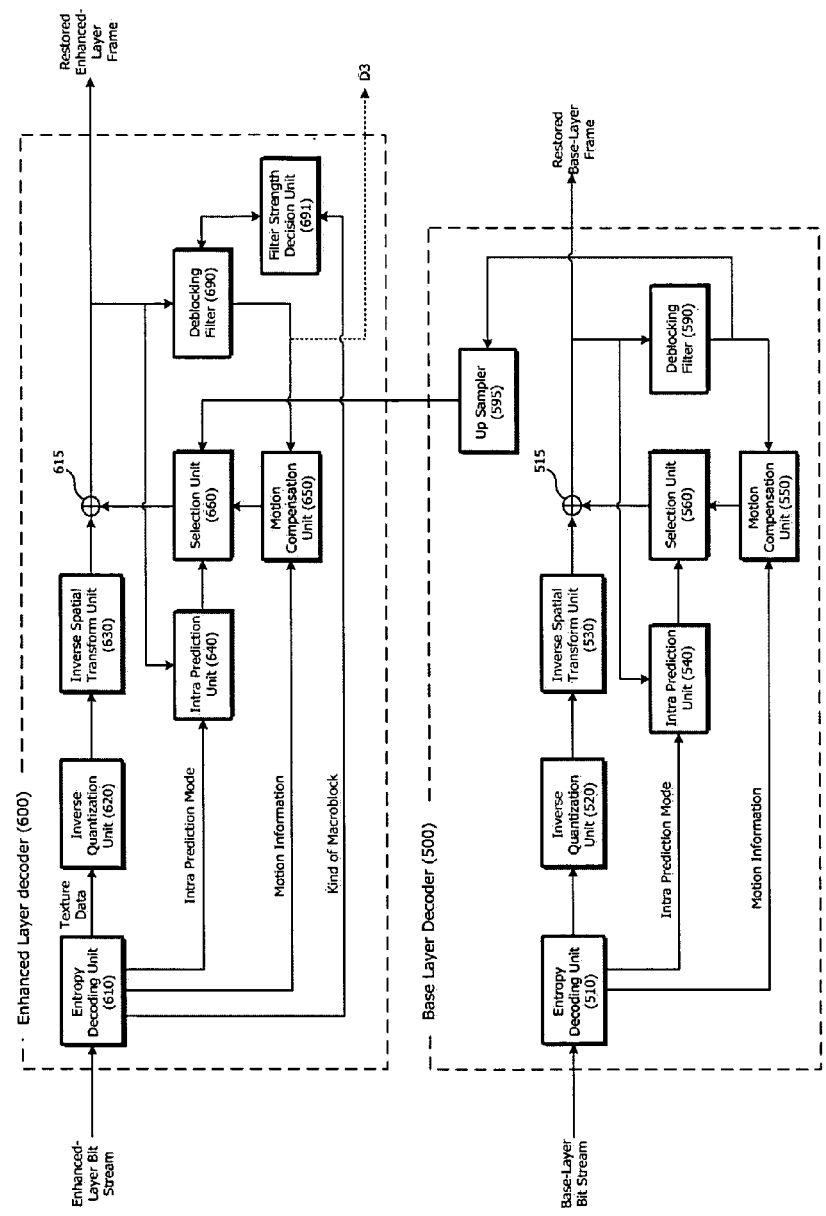
FIG. 13 is a block diagram illustrating the construction of a video decoder according to an embodiment of the present invention.

FIG. 13 is a block diagram illustrating the construction of a video decoder 3000 according to an embodiment of the present invention. The video decoder 3000 includes an enhanced-layer decoder 600 and a base-layer decoder 500.

First, the construction of the enhanced-layer decoder 600 will be explained. An entropy decoding unit 610 performs a lossless decoding of the input enhanced-layer bit stream, in contrast to the entropy coding unit, and extracts macroblock type information (i.e., information that indicates the kind of the macroblock), intra prediction mode, motion information, texture data, and other information.

The bit stream may be constructed as the example illustrated in FIG. 9. Here, the kind of the macroblock is known from the mb_type field 80; the detailed intra prediction mode and motion information is known from the mb_pred field 85; and the texture data is known by reading the texture data field 90.

The entropy decoding unit 610 provides the texture data to an inverse quantization unit 620, the intra prediction mode to an intra prediction unit 640 and motion information to a motion compensation unit 650. Also, the entropy decoding unit 610 provides the type of information of the present macroblock to a filter strength decision unit 691.

The inverse quantization unit 620 inversely quantizes the texture information transferred from the entropy decoding unit 610. At this time, the same quantization table as that used in the video encoder side is used.

Then, an inverse spatial transform unit 630 performs an inverse spatial transform on the result of inverse quantization. This inverse spatial transform corresponds to the spatial transform performed in the video encoder. That is, if the DCT transform is performed in the encoder, an inverse DCT is performed in the video decoder, and if the wavelet transform is performed in the video encoder, an inverse wavelet transform is performed in the video decoder. As a result of inverse spatial transform, the residual frame is restored.

The intra prediction unit 640 generates a predicted block for the present intra block from the restored neighboring intra block outputted from an adder 615 according to the intra prediction mode transferred from the entropy decoding unit 610 to provide the generated predicted block to the selection unit 660.

Meanwhile, the motion compensation unit 650 performs motion compensation using the motion information provided from the entropy decoding unit 610 and the reference frame provided from a deblocking filter 690. The predicted frame, generated as a result of motion compensation, is provided to the selection unit 660.

Additionally, the selection unit 660 selects one among a signal transferred from an up sampler 590, a signal transferred from the motion compensation unit 650 and a signal transferred from the intra prediction unit 640 and transfers the selected signal to the adder 615. At this time, the selection unit 660 discerns the type information of the present macroblock provided from the entropy decoding unit 610 and selects the corresponding signal among the three kinds of signals according to the type of the present macroblock.

The adder 615 adds the signal outputted from the inverse spatial transform unit 630 to the signal selected by the selection unit 660 to restore the video frame of the enhanced layer.

The filter strength decision unit 691 decides the filter strength with respect to the macroblock boundary and the block boundaries in one macroblock according to the filter strength decision method as explained with reference to FIG. 3 and FIG. 7. In this case, in order to perform the filtering, the type of macroblock, as illustrated in FIG. 12, should be known, and the information about the type of macroblock is provided from the entropy decoding unit 610.

The resultant frame D3 filtered by the deblocking filter 690, as described above, is provided to the motion compensation unit 650 to generate an inter prediction frame for other input frames. Also, if an enhanced layer above the present enhanced layer exists, the frame D3 may be provided as the reference frame when the prediction of the intra BL mode is performed for the upper enhanced layer.

The construction of the base-layer decoder 500 is similar to that of the enhanced-layer decoder. However, since the base-layer decoder 500 cannot use information of a lower layer, a selection unit 560 selects one of the intra-predicted signal and the inter-predicted signal, and the deblocking filter 590 decides the filter strength in the same manner as in the conventional H.264 algorithm. Also, an up sampler 595 performs an up sampling of the result filtered by the deblocking filter 590 and provides the up-sampled signal to the selection unit 660 of the enhanced layer.

Since operations of other constituent elements are the same as those of the constituent elements of the enhanced-layer decoder 600, a detailed explanation thereof will be omitted.

As described above, it is exemplified that the video encoder or the video decoder includes two layers, i.e., a base layer and an enhanced layer. However, this is merely exemplary, and it will be apparent to those skilled in the art that a video coder having three or more layers can be implemented.

Up to now, the respective constituent elements of FIGS. 8 and 13 refer to software or hardware such as a FPGA (Field Programmable Gate Array) or an ASIC (Application Specific Integrated Circuit). However, the respective constituent elements may be constructed to reside in an addressable storage medium or to execute one or more processors. Functions provided in the respective constituent elements may be separated into further detailed constituent elements or combined into one constituent element, all of which perform specified functions.

FIGS. 14a to 16b illustrate experimental results of embodiments of the present invention as compared with the prior art. Here, an SVM 3.0 model of "ISO/IEC 21000 Scalable Video Coding, N6716, Palma, October 2004" was used as the prior art.

Figure 14A:
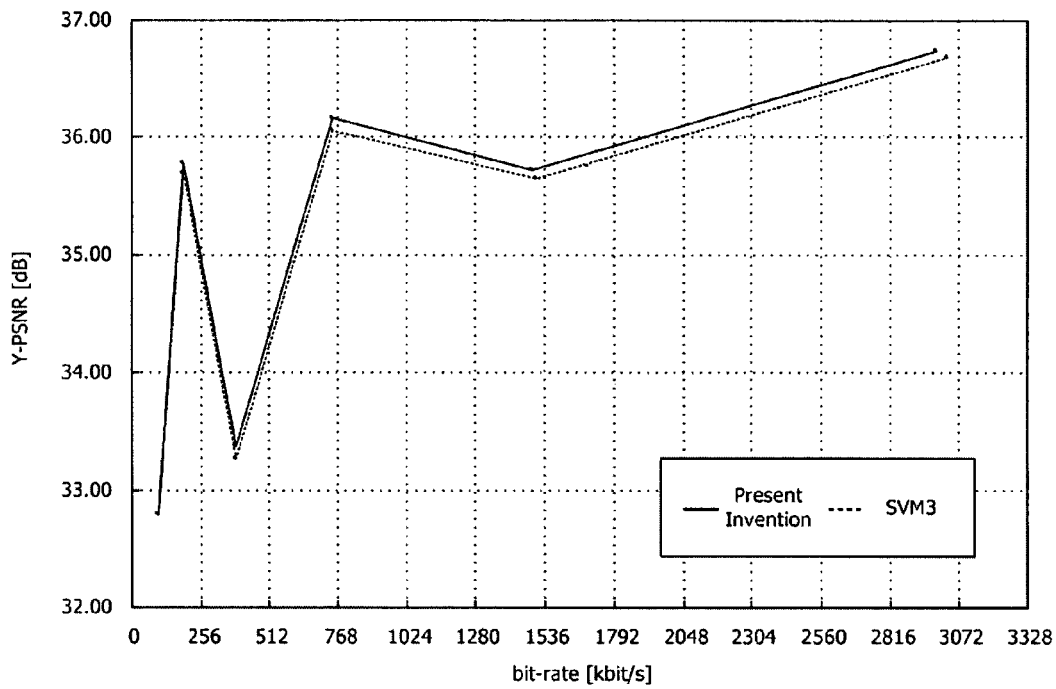
FIG. 14a is a graph illustrating a luminance component PSNR according to a variation of a bit rate in a crew sequence.
Figure 14B:
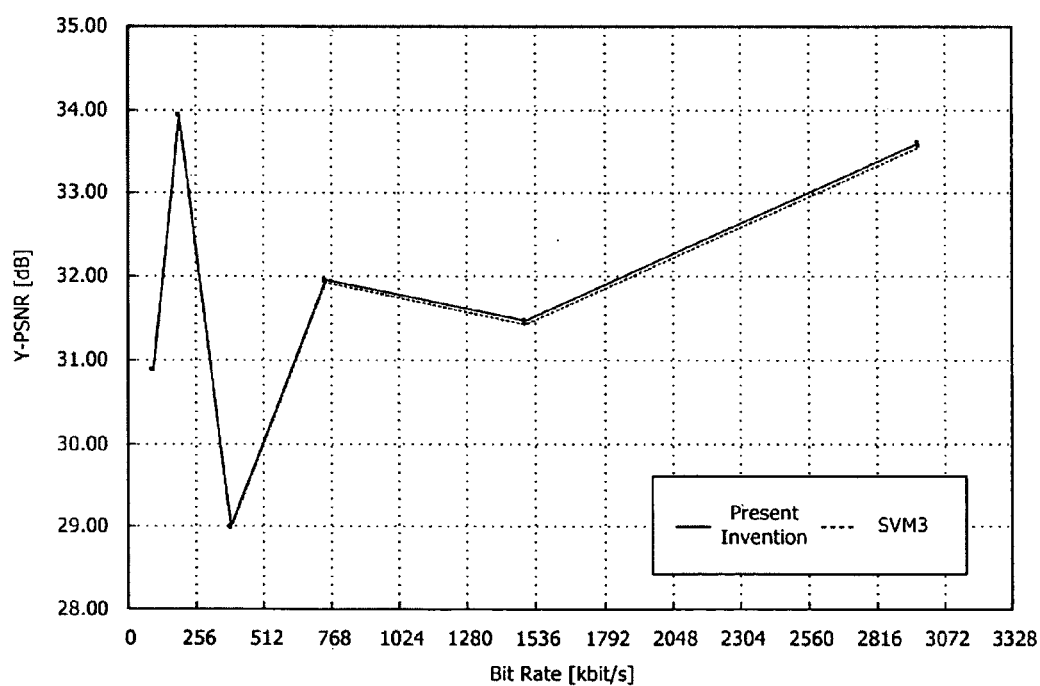
FIG. 14b is a graph illustrating a luminance component PSNR according to a variation of a bit rate in a harbour sequence.

FIG. 14a is a graph illustrating the luminance component PSNR (i.e., Y-PSNR) according to a variation of the bit rate in a crew sequence, and FIG. 14b is a graph illustrating the luminance component PSNR (i.e., Y-PSNR) according to a variation of the bit rate in a harbour sequence. In the crew sequence, it can be confirmed that the picture quality is clearly improved by about 0.1 to 0.2 dB. Meanwhile, in the harbour sequence, the picture quality improvement is insignificant. However, in all cases, no picture-quality deterioration occurred. Accordingly, the method according to embodiments of the present invention has a great effect on rapid motion sequences, but has a relatively little effect on slow motion sequences or those having a strong temporal correlation. It is believed that this is because embodiments of the present invention improves the performance in the case of using the intra BL macroblock, but the number of intra BL macroblocks is small in the case of the slow motion sequences or those having strong temporal correlations.

Figure 15A:
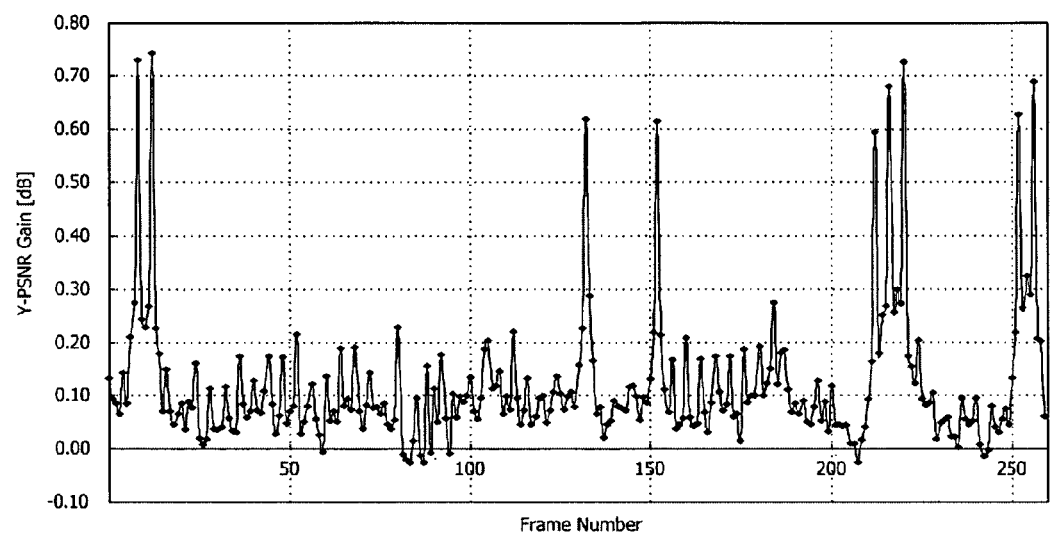
FIG. 15a is a graph illustrating the performance improvement of the present invention over the prior art with respect to a football sequence of CIF@1024 kbps.
Figure 15B:
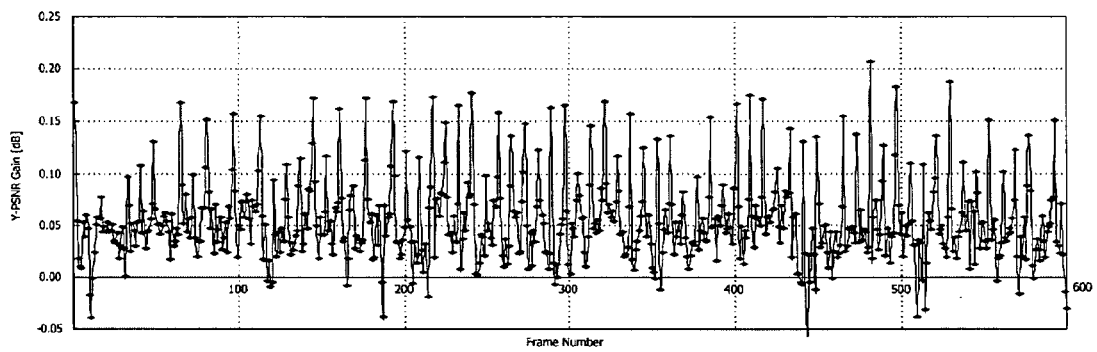
FIG. 15b is a graph illustrating the performance improvement of the present invention over the prior art with respect to a crew sequence of 4CIF@3000 kbps.

FIGS. 15a and 15b are graphs illustrating the performance improvement of embodiments of the present invention over the prior art with respect to a football sequence of CIF@1024 kbps and with respect to a crew sequence of 4CIF@3000 kbps. As illustrated in FIGS. 14a and 14b, the average PSNR improvement is not great, but it is confirmed that the PSNR value is improved by up to 0.7 dB in some frames. Also, in the crew sequence, it is confirmed that the PSNR value of several frames is improved by up to 0.17 dB. According to embodiments of the present invention, the picture quality is greatly improved in the frames having rapid motion, while according to the prior art, the picture quality severely deteriorates in the frames having rapid motion.

Figure 16A:
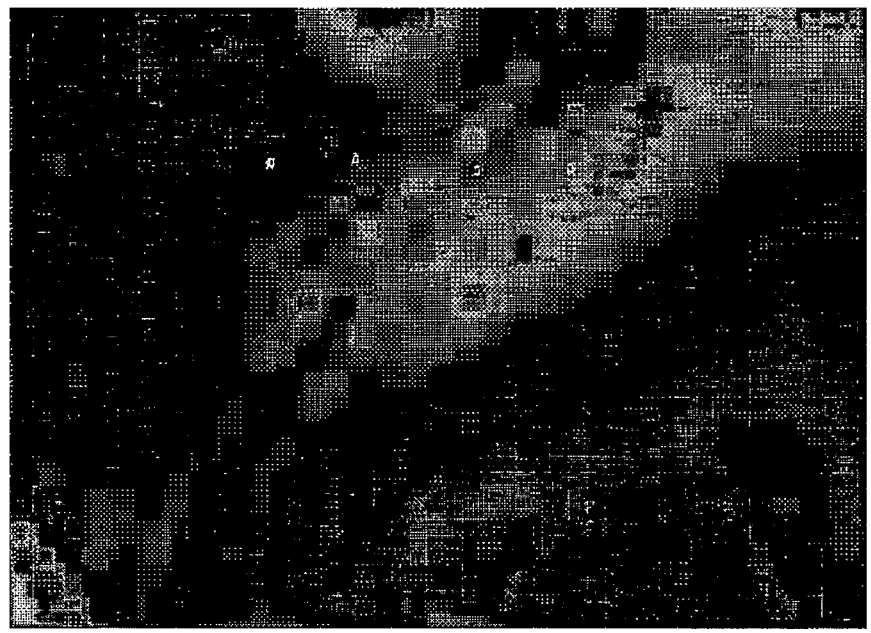
FIG. 16a is a view illustrating one frame of a football sequence restored by the prior art.
Figure 16B:
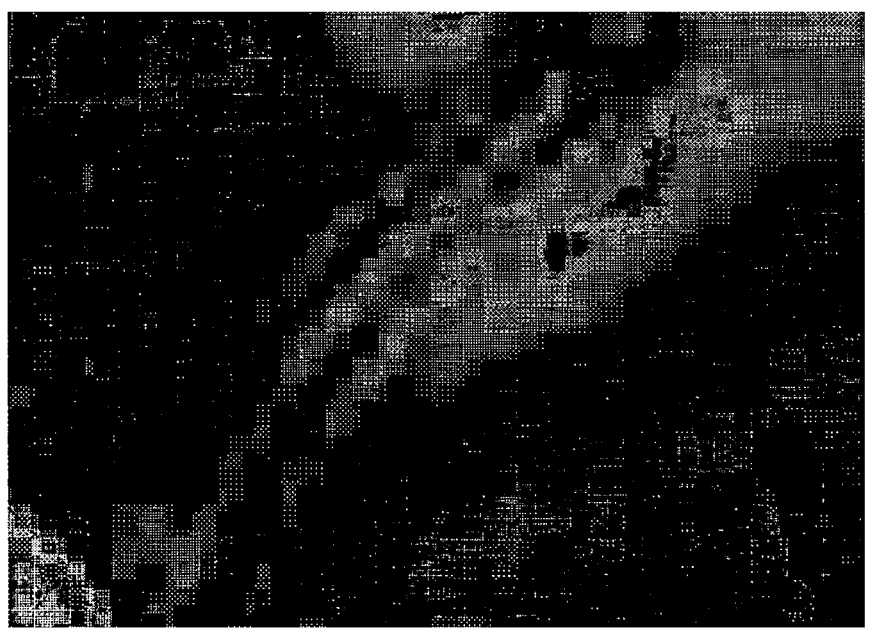
FIG. 16b is a view illustrating the frame of FIG. 16a restored according to the present invention.

FIGS. 16a and 16b are views illustrating one frame of a football sequence restored by the prior art and one frame of FIG. 16a restored according to embodiments of the present invention, respectively. Here, the football sequence of CIF@1024 kbps is used. As shown in FIGS. 16a and 16b, the method according to embodiments of the present invention reduces an over-smoothing effect that is generated during the deblocking process, and thus, can preserve the visual details well in comparison to the method in the prior art.

According to embodiments of the present invention, the deblocking filter strength can be properly set according to whether a certain block, to which the deblocking filter will be applied, is an intra BL mode block, in the multilayer video encoder/decoder.

Additionally, by setting the proper deblocking filter strength (as above), the picture quality of the restored video can be improved.

Embodiments of the present invention have been described for illustrative purposes, and those skilled in the art will appreciate that various modifications, additions and substitutions are possible without departing from the scope and spirit of the invention as disclosed in the accompanying claims.

What is claimed is:

1. A method for deciding a deblocking filter strength for a frame comprising a plurality of blocks of a present layer using a processor, the method comprising:
   (a) choosing a present block and a neighboring block on which a deblocking filtering will be performed;
   (b) determining whether the present block and the neighboring block are coded by an intra base layer (BL) coding, under control of the processor; and
   (c) deciding the deblocking filter strength according to a result of the determining,
   wherein, in the intra BL coding, the present block of the present layer is predicted using a lower layer of the present layer.

2. A method for performing a deblocking filtering of a frame comprising a plurality of blocks of a present layer, the method comprising:
   (a) choosing a present block on which a deblocking filtering will be performed and a neighboring block from the plurality of blocks;
   (b) determining whether the present block and the neighboring block are coded by an intra base layer (BL) coding, under control of the processor;
   (c) deciding a deblocking filter strength according to a result of the determining; and
   (d) performing the deblocking filtering with respect to a boundary between the present block and the neighboring block according to the deblocking filter strength,
   wherein, in the intra BL coding, the present block of the present layer is predicted using a lower layer of the present layer.

3. The method as claimed in claim 2, wherein (c) comprises:
   (c1) if at least one of the present block and the neighboring block is coded by a coding other than the intra BL coding, deciding a specified deblocking filter strength with respect to the boundary between the present block and the neighboring block; and
   (c2) if the present block and the neighboring block are coded by the intra BL coding, deciding a deblocking filter strength that is lower than the deblocking filter strength decided with respect to the boundary.

4. The method as claimed in claim 3, wherein (c1) further comprises choosing a lower deblocking filter strength in a case in which the present block and the neighboring block are coded by the intra BL coding in comparison to a case in which one of the two blocks is coded by a coding other than the intra BL coding.

5. The method as claimed in claim 2, wherein each block of the plurality of blocks has a size of 4×4 pixels.

6. The method as claimed in claim 2, wherein the deblocking filter strength decided in (c) is divided into deblocking filter strengths of different sizes according to whether a block boundary coincides with a macroblock boundary, and if the block boundary coincides with the macroblock boundary, choosing a higher deblocking filter strength with respect to the block boundary.

7. The method as claimed in claim 6, wherein if the boundary coincides with the macroblock boundary, the deblocking filter strength chosen in (c1) is '4' and the deblocking filter strength chosen in (c2) is '1'.

8. The method as claimed in claim 6, wherein if the boundary does not coincide with the macroblock boundary, the deblocking filter strength chosen in (c1) is '3' and the deblocking filter strength chosen in (c2) is '1'.

9. The method as claimed in claim 2, wherein the boundary is at least one of a horizontal boundary or a vertical boundary between the present block and the neighboring block.

10. A video encoding method based on a multilayer using a deblocking filtering, the method comprising:
   (a) encoding an input video frame;
   (b) decoding the encoded frame;

(c) deciding a deblocking filter strength by determining whether at least one of a present block and a neighboring block included in the decoded frame of a present layer is coded by an intra coding, and, if at least one of the two block is coded by the intra coding, then determining whether the two blocks are coded by an intra base layer (BL) coding; and (d) performing the deblocking filtering with respect to a boundary between the two blocks according to the chosen deblocking filter strength, wherein, in the intra BL coding, the present block of the present layer is predicted using a lower layer of the present layer.

11. The video encoding method as claimed in claim 10, wherein (c) comprises:

(c1) choosing the present block on which the deblocking filtering will be performed among a plurality of blocks that constitute the decoded frame and the neighboring block;

(c2) determining whether the two blocks are coded by an intra BL coding; and (c3) choosing the deblocking filter strength according to a result of the determining.

12. The video encoding method as claimed in claim 11, wherein a result of performing the deblocking filtering is provided for performing an inter prediction with respect to a subsequent input frame.

13. The video encoding method as claimed in claim 11, wherein the result of performing the deblocking filtering is provided for performing a prediction according to the intra BL coding on an upper layer of the present layer.

14. The video encoding method as claimed in claim 11, wherein (c3) comprises:

(c31) if at least one of the two blocks is coded by a coding other than the intra BL coding, choosing a specified deblocking filter strength with respect to the boundary between the two blocks; and (c32) if the two blocks are coded by the intra BL coding, choosing a deblocking filter strength that is lower than the deblocking filter strength decided with respect to the boundary.

15. The method as claimed in claim 14, wherein if the boundary coincides with a macroblock boundary, the deblocking filter strength chosen in (c31) is '4' and the deblocking filter strength chosen in (c32) is '1'.

16. The method as claimed in claim 14, wherein if the boundary does not coincide with a macroblock boundary, the deblocking filter strength chosen in (c31) is '3' and the deblocking filter strength chosen in (c32) is '1'.

17. A video decoding method based on a multilayer using deblocking filtering, the method comprising:

(a) restoring a video frame from an input bit stream;

(b) choosing a deblocking filter strength by determining whether at least one of a present block and a neighboring block constituting the restored frame of a present layer is coded by an intra coding, and, if at least one of the two blocks is coded by the intra coding, then determining whether the two blocks are coded by an intra base layer (BL) coding; and (c) performing the deblocking filtering with respect to a boundary between the two blocks according to the chosen deblocking filter strength.

18. The video decoding method as claimed in claim 17, wherein (b) comprises:

(b1) choosing the present block on which the deblocking filtering will be performed among a plurality of blocks that constitute the decoded frame and the neighboring block;

(b2) determining whether the two blocks are coded by the intra BL coding; and (b3) choosing the deblocking filter strength according to a result of the determining.

19. The video decoding method as claimed in claim 18, wherein the result of performing the deblocking filtering is provided for performing motion compensation with respect to a subsequent input frame.

20. The video decoding method as claimed in claim 18, wherein the result of performing the deblocking filtering is provided for restoring a macroblock of an upper layer of the present layer encoded by the intra BL coding.

21. The video decoding method as claimed in claim 18, wherein (b3) comprises:

(b31) if at least one of the two blocks is coded by a coding other than the intra BL coding, choosing a specified deblocking filter strength with respect to the boundary between the two blocks; and (b32) if the two blocks are coded by the intra BL coding, choosing a deblocking filter strength that is lower than the deblocking filter strength chosen with respect to the boundary.

22. The method as claimed in claim 21, wherein if the boundary coincides with a macroblock boundary, the deblocking filter strength chosen in (b31) is '4' and the deblocking filter strength chosen in (b32) is '1'.

23. The method as claimed in claim 21, wherein if the boundary does not coincide with a macroblock boundary, the deblocking filter strength chosen in (b31) is '3' and the deblocking filter strength chosen in (b32) is '1'.

24. A video encoder based on a multilayer using deblocking filtering, the video encoder comprising:

means for encoding an input video frame;

means for decoding the encoded frame;

means for choosing a deblocking filter strength by determining whether at least one of a present block and a neighboring block included in the decoded frame of a present layer is coded by an intra coding, and, if at least one of the two blocks is coded by the intra coding, then determining whether the two blocks are coded by an intra base layer (BL) coding; and means for performing the deblocking filtering with respect to a boundary between the two blocks according to the chosen deblocking filter strength, wherein, in the intra BL coding, the present block of the present layer is predicted using a lower layer of the present layer.

25. A video decoder based on a multilayer using deblocking filtering, the video decoder comprising:

means for restoring a video frame from an input bit stream;

means for deciding a deblocking filter strength by determining whether at least one of a present block and a neighboring block included in the decoded frame of a present layer is coded by an intra coding, and, if at least one of the two blocks is coded by the intra coding, then determining whether the two blocks are coded by an intra base layer (BL) coding; and means for performing the deblocking filtering with respect to a boundary between the two blocks according to the chosen deblocking filter strength, wherein, in the intra BL coding, the present block of the present layer is predicted using a lower layer of the present layer.

26. A non-transitory computer-readable recording medium including a program code that can be executed by a computer in order to perform a video encoding method which comprises:
(a) encoding an input video frame;
(b) decoding the encoded frame;
(c) deciding a deblocking filter strength according to whether a present block and a neighboring block included in the decoded frame of a present layer are coded by an intra base layer (BL) coding; and
(d) performing the deblocking filtering with respect to a boundary between the present block and the neighboring block according to the chosen deblocking filter strength,
wherein, in the intra BL coding, the present block of the present layer is predicted using a lower layer of the present layer.

27. The non-statutory computer-readable recording medium as claimed in claim 26, wherein (c) comprises:
(c1) choosing the present block on which the deblocking filtering will be performed among a plurality of blocks that constitute the decoded frame and the neighboring block;
(c2) determining whether the present block and the neighboring block are coded by an intra BL coding; and
(c3) choosing the deblocking filter strength according to a result of the determining.

28. A non-statutory computer-readable recording medium including a program code that can be executed by a computer in order to perform a video decoding method which comprises:
(a) restoring a video frame from an input bit stream;
(b) choosing a deblocking filter strength according to whether a present block and a neighboring block included in the decoded frame of a present layer are coded by an intra base layer (BL) coding; and
(c) performing the deblocking filtering with respect to a boundary between the present block and the neighboring block according to the chosen deblocking filter strength,
wherein, in the intra BL coding, the present block of the present layer is predicted using a lower layer of the present layer.

29. The non-statutory computer-readable recording medium as claimed in claim 28, wherein (b) comprises:
(b1) choosing the present block on which the deblocking filtering will be performed among a plurality of blocks that constitute the decoded frame and the neighboring block;
(b2) determining whether the present block and the neighboring block are coded by the intra BL coding; and
(b3) choosing the deblocking filter strength according to a result of the determining.

* * * * *